United States Patent [19]
Worrall et al.

[11] Patent Number: 5,368,060
[45] Date of Patent: Nov. 29, 1994

[54] VALVES

[75] Inventors: Peter W. Worrall, Ferryhill; Adrian M. Woodward, Cambridge, both of England

[73] Assignee: AB Electrolux, Stockholm, Sweden

[21] Appl. No.: 120,402

[22] Filed: Sep. 13, 1993

[30] Foreign Application Priority Data

Sep. 15, 1992 [GB] United Kingdom ............. 9219474.5

[51] Int. Cl.$^5$ ...................... F16K 25/00; F16K 31/02
[52] U.S. Cl. ................. 137/15; 251/129.06; 251/334; 251/359
[58] Field of Search ............. 251/129.06, 334, 359; 137/15

[56] References Cited

U.S. PATENT DOCUMENTS

| Re. 31,417 | 10/1983 | Huber | 251/334 X |
|---|---|---|---|
| 3,360,664 | 12/1967 | Straube. | |
| 4,105,187 | 8/1978 | Huber | 251/334 |
| 4,134,572 | 1/1979 | Schmidt | 251/359 X |
| 4,545,561 | 10/1985 | Brown. | |
| 4,787,071 | 11/1988 | Kreuter et al. | 251/129.06 X |
| 5,152,504 | 10/1992 | Nixon et al. | 251/334 X |
| 5,238,223 | 8/1993 | Mettner et al. | 251/129.06 X |

FOREIGN PATENT DOCUMENTS 1471211 4/1977 United Kingdom.

*Primary Examiner*—Stephen M. Hepperle
*Attorney, Agent, or Firm*—Nixon & Vanderhye

[57] ABSTRACT

A valve comprises a valve seat member and a movable valve member (preferably a disc with at least one face coated with piezo electric material) movable towards and away from the seat to close and open the valve and a sealing element made from a resilient material and attached to one of the members. The sealing element possesses an initial deformable characteristic so that initial closure of the valve causes the seating element to substantially conform to the shape of the other member and retain the so-conformed shape. The sealing element comprises first and second springs of different resiliently formable characteristics, the second spring preferably being a ring of elastomeric material, and the first spring—after initial deformation of the sealing element—being rigidly adhesively secured to the valve seat member.

20 Claims, 2 Drawing Sheets

5,368,060

VALVES

BACKGROUND AND SUMMARY OF THE INVENTION

This invention relates to valves and, more particularly, to the sealing of valves during closure.

Valves are used in many fields for controlling the flow of liquid and gaseous media and throughout this specification and claims, such media will be referred to simply as a fluid or fluids as the context requires.

Numerous forms of valve have been proposed having a valve seat member and a valve closure member movable towards and away from the seat member to close and open the valve to control fluid flow through the valve. In order to produce and maintain a satisfactory seal during closure, confronting surfaces of the seat and closure member must be fashioned in strict conformity. Such strict conformity requires, in many instances, accurate machining of the confronting surfaces of the members.

It is known to control the operation of valves by mechanical, electrical, electronic and pneumatic means.

Piezo electric control valves have also been proposed as substitutes for solenoid controlled valves and are preferable in installations where size and weight are important design considerations. Piezo electric control valves may take the form of discs, usually circular, and beams which may be supported at each end or simply, cantilevered.

Where piezo electric control valves are in the form of circular discs, peripheral flatness not infrequently introduces sealing problems. This is principally due to the fact that it is difficult to produce, on a production basis, relatively thin metal discs possessing a sufficiently high degree of flatness to mate with a corresponding flat surface machined or otherwise formed on a valve seat. Typically, such 30 thin metal discs constitute substrates for supporting piezo electric ceramic materials on one or each face of the disc. Examples of such piezo electric valves are described in U.S. Pat. Nos. 4,545,561 and 3,360,664, the disclosures of which are incorporated by reference herein.

In prior U.K. patent application no. 9122739.7 there is described and claimed a piezo valve for controlling fluid flow, the valve comprising a valve housing, a cavity within the housing, inlet and outlet ducts leading fluid into and out from the cavity, a movable piezo electric valve disc element, disposed in the cavity, and means for supporting the valve disc element at a position inwardly of the disc periphery so that upon actuation of the element by a voltage applied thereto, the periphery of the disc is displaceable and at least a portion of a peripheral region of the disc serves to control fluid flaw between the inlet and outlet ducts.

The peripheral flatness of a piezo electric disc forming part of a valve described in U.K. no. 9122739.7 is typically of the order of ±250 μm whereas the opening per se for fluid flow is of the order of ≦300 μm. It will therefore, be appreciated that if closure is achieved using a pliant sealing member to accommodate the tolerance mentioned, the effective valve opening could be reduced to 300−250 =50 μm. Such an opening is generally insufficient to achieve a satisfactory flow fluid when the valve is open. In addition, the peripheral flatness problem also manifests itself when using a pliant seal in so far that the seal produces an unexpectedly adverse fluid flow against voltage characteristics.

It is an object of the present invention to provide a production system which will provide a relatively low cost valve seal for accommodating normal production tolerances without wasting operational movement of the valve.

According to one aspect of the present invention, a valve comprises a valve seat member and a movable valve member movable towards and away from the valve seat member to close and open the valve. A sealing element made from a resilient material is attached to one of the members (preferable the valve seat member). The sealing element possesses an initial deformable characteristic such that initial closure of the valve causes the sealing element to substantially conform to the shape of the other member (movable valve member) and retain the so-conformed shape. Preferably, the sealing element is permanently attached to the valve seat member.

The movable valve member is preferably in the form of a piezo electric disc comprising a substrate having a layer of piezo ceramic applied to at least one face thereof.

According to a further aspect of the present invention a method of forming a valve seat for creating a seal against a valve member having an irregular surface is provided. The method comprises the steps of: (a) assembling the valve seat from two compliant elements disposed in juxtaposition, each element initially possessing a different resiliently deformable characteristic, one having a least and the other a most resiliently deformable characteristic, and together constituting a seal assembly which conforms to the peripheral shape of the valve member. (b) placing the seal assembly in a housing with the element possessing the least resiliently deformable characteristic most remote from the movable valve member. (c) applying pressure to the seal assembly via the movable valve member so that the least resiliently deformable element absorbs the surface irregularity of the valve member without substantially changing the deformability characteristic of the other element, and, (b) maintaining the element possessing the least resiliently deformable characteristic in that attitude where the surface irregularity of the movable valve member is absorbed.

The compliant (resilient) elements may be made from any suitable synthetic or natural rubber-like material.

Thus, a material may be chosen to achieve the dichotomous properties in a single component which posses two mechanical states: the first being soft and compliant and the second being semi rigid with the required changes described above being easy to effect yet irreversible.

DETAILED DESCRIPTION OF THE DRAWINGS

Figure 1:
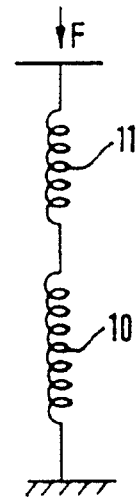
FIG. 1 is a schematic of an imaginary mechanical spring system with which the invention may be functionally compared.

A valve seat in accordance with the present invention may from a mechanical point of view be compared to a spring system comprising two dissimilar spring 10, 11 connected in series as shown in FIG. 1.

Figure 2:
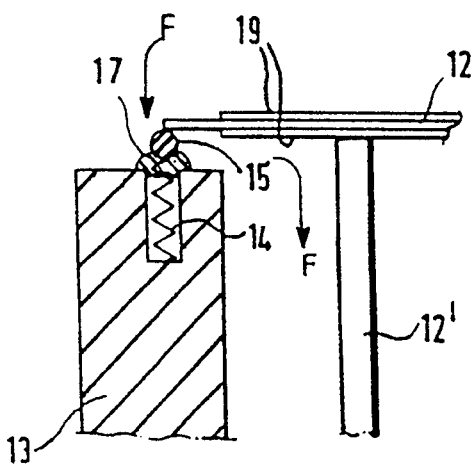
FIGS. 2 and 3 are detailed side views, partly in cross-section and partly in elevation, of a valve including a centrally supported piezo electric valve disc.
Figure 3:
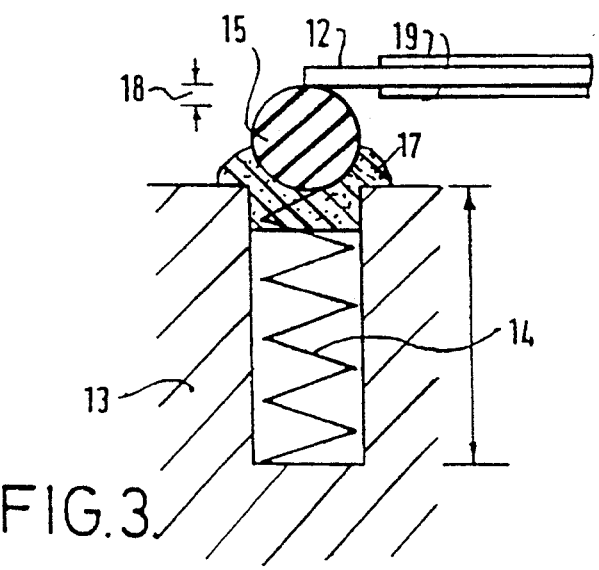
Figure 4:
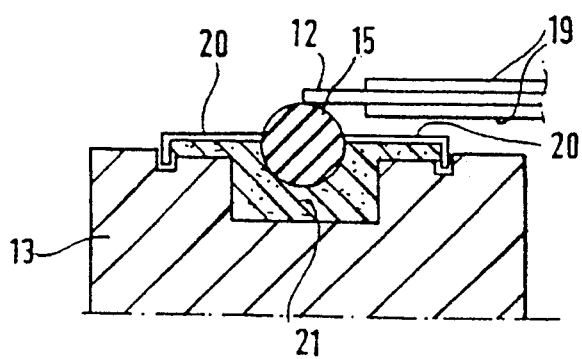
FIGS. 4 and 5 are views like that of FIG. 3 showing exemplary alternative sealing arrangements.
Figure 6:
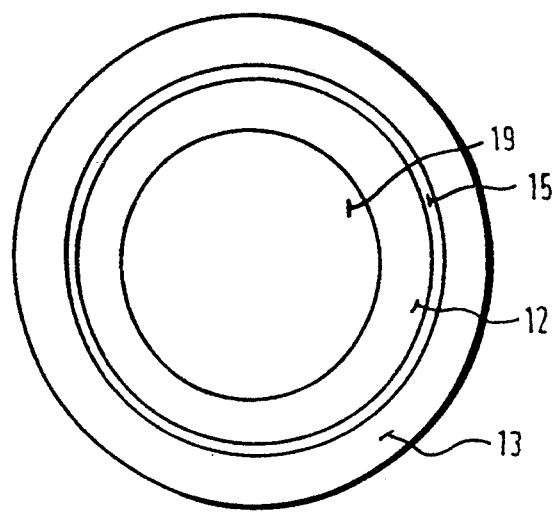
FIG. 6 is a top plan view of the valve of FIGS. 2 and 3.
Figure 5:
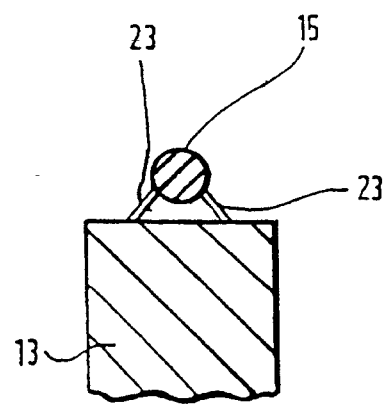

FIGS. 2 and 3 show a piezo electric valve disc 12 centrally supported and as described in UK application no. 9122739.7. FIGS. 4 and 5 show alternative sealing arrangements for the valve.

Referring to FIG. 1 spring 10 serves to absorb production flatness tolerance of piezo disc 12 (FIG. 2 ) without radically changing the compression (and, therefore, the sealing force) in the second spring 11. The first spring 10 is therefore, compared to the second spring 11 both long and weak. The second spring 11 is the normal sealing element and its stiffness is chosen according to well understood design parameters.

According to the invention, as seen in FIGS. 2 and 3, the first spring 14 is a helical compression spring (e.g. about 8 mm in length). While the second spring 15 is a compliant (elastomeric) element of any suitable synthetic or natural rubber like material having a circular cross-section (e.g. about 2 mm in diameter). During assembly, both springs 14 and 15 are free to move and accommodate the tolerances in all dependent components such as disc 12 mounted on central support 12', and housing 13. The second spring 15 has a constant compression (since there is a spatially constant force applied) and, therefore, matches exactly the profile irregularity of the disc 12. However, after initial assembly the first spring 14 is locked to prevent further movement by, for example, an adhesive (rigid glue) 17 and, therefore, only the second spring 15 participates in the subsequent sealing operations (see FIG. 3). The maximum compression 18 is typically about 20 microns.

The valve seat comprises the housing 13, while a seating (sealing element comprises springs 14, 15 and adhesive 17, and the valve disc 12 comprises a movable valve member, having piezo electric activators 19 associated therewith, to effect movement thereof. The piezo electric activator 19 preferably comprise a layer of piezo electric ceramic applied to a least one face of disc 12 (both faces in FIGS. 2 through 4). The spring 15 is preferably annular, extending around the periphery of the disc 12, while plurality of different coil springs 14 may be provided as the first spring.

Fluid flows between the spring multiple component sealing element 15, 14 and the movable valve disc 12 when the piezo electric activators 19 cause peripheral portions of the Referring to FIG. 4, the helical (coil) spring 14 of FIG. 3 has been replaced by a plurality of leaf springs which support second spring 75 which is the form of a ring of circular cross-section. Upon assembly, and after an initially applied force via the valve member (disc 12), springs 20 are locked or otherwise secured to housing 13 by glue 21.

A further form of an equivalent spring arrangement is shown in FIG. 5 in which the first metal spring elements 23 (about 4 mm in length 25 and 0.4 mm thick) are rigidly connected to housing 73 and second spring 75 after initial deformation.

While the invention has been described in connection with what is presently considered to be most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A valve comprising:
   a valve seat member;
   a movable valve member movable towards and away from the valve seat member to close and open the valve; and
   a multiple component sealing element made from a resilient material and attached to one of the valve seat and movable valve members, the sealing element possessing an initial deformable characteristic and a deformed retention characteristic, the deformable characteristic being such that initial closure of the valve causes the sealing element to substantially conform to the shape of the other member and the deformed retention characteristic being such as to cause the sealing element to retain the so-conformed shape.

2. A valve as recited in claim 1, wherein the sealing element is permanently attached to the valve seat member.

3. A valve as recited in claim 2 wherein the movable valve member is a piezo electric disc comprising a substrate having a layer of piezo electric ceramic applied to at least one face thereof.

4. A valve as recited in claim 1 wherein the movable valve member is a piezo electric disc comprising a substrate having a layer of piezo electric ceramic applied to at least one face thereof.

5. A valve recited in claim 2 wherein the sealing element comprises first and second spring members, the first spring member having lesser resiliently deformable characteristics than the second spring member, said second spring member being more remote from said valve seat member, and closer to said movable valve member, than said first spring member.

6. A valve as recited in claim 3 wherein the sealing element comprises first and second spring members, the first spring member having lesser resiliently deformable characteristics than the second spring member, said second spring member being more remote from said valve seat member, and closer to said movable valve member, than said first spring member.

7. A valve as recited in claim 6 wherein said second spring member comprises a ring of elastomeric material.

8. A valve as recited in claim 7 wherein said first spring member comprises a plurality coil springs or a plurality of leaf springs.

9. A valve as recited in claim 8 wherein said first spring member is connected to said second spring member and said valve seat by a rigid adhesive.

10. A valve as recited in claim 7 wherein said first spring member is connected to said second spring member and said valve seat by a rigid adhesive.

11. A method of forming a valve seat for creating a seal against a movable valve member having an irregular surface, the method comprising the steps of:
   (a) assembling the valve seat from two compliant elements disposed in juxtaposition, each element initially possessing a different resiliently deformable characteristic, one having a least and the other a most resiliently deformable characteristic, and together constituting a seal which conforms to the peripheral shape of the valve member;

(b) placing the assembly in a housing with the element possessing the least resiliently deformable characteristic most remote from the movable valve member;

(c) applying pressure to the sealing assembly via the movable valve member so that the least resiliently deformable element absorbs the surface irregularity of the valve member without substantially changing the deformability characteristic of the other element; and (d) maintaining the element possessing the least resiliently deformable characteristic in that attitude where the surface irregularity of the movable valve member is absorbed.

12. A method as recited in claim 11 wherein step (d) is practiced by permanently adhesively securing the least resiliently deformable element to the housing.

13. A valve comprising:
a valve seat number;
a movable valve member movable towards and away from the valve seat member to close and open the valve;
a sealing element permanently attached to the valve seat member and made from a resilient material and attached to one of the valve seat and movable valve members, the sealing element possessing an initial deformable characteristic such that initial closure of the valve causes the sealing element to substantially conform to the shape of the other member and retain the so-conformed shape; and
said sealing element comprising first and second spring members, the first spring member having lesser resiliently deformable characteristics than the second spring member, said second spring member being more remote from said valve seat member, and closer to said movable valve member, than said first spring member.

14. A valve as recited in claim 13 wherein said second spring member comprises a ring of elastomeric material.

15. A valve as recited in claim 13 wherein said first spring member comprises a plurality coil springs or a plurality of leaf springs.

16. A valve as recited in claim 15 wherein said first spring member is connected to said second spring member and said valve seat by a rigid adhesive.

17. A valve as recited in claim 14 wherein said first spring member is connected to said second spring member and said valve seat by a rigid adhesive.

18. A valve comprising:
a valve seat member;
a movable valve member movable towards and away from the valve seat member to close and open the valve and comprising a piezo electric disc comprising a substrate having a layer of piezo electric ceramic applied to at least one face thereof; and
a sealing element made from a resilient material and attached to one of the valve seat and movable valve members, the sealing element possessing an initial deformable characteristic such that initial closure of the valve causes the sealing element to substantially conform to the shape of the other member and retain the so-conformed shape.

19. A valve as recited in claim 18, wherein the sealing element is permanently attached to the valve seat member.

20. A valve as recited in claim 19 wherein the sealing element comprises first and second spring members, the first spring member having lesser resiliently deformable characteristics than the second spring member, said second spring member being more remote from said valve seat member, and closer to said movable valve member, than said first spring member.

* * * * *